May 26, 1953 H. WALLMAN 2,640,157
RAPID SEARCHING THERMAL AUTOMATIC FREQUENCY CONTROL
Filed Nov. 29, 1945 2 Sheets-Sheet 1

INVENTOR
HENRY WALLMAN
BY M. O. Hayes
ATTORNEY

May 26, 1953 H. WALLMAN 2,640,157

RAPID SEARCHING THERMAL AUTOMATIC FREQUENCY CONTROL

Filed Nov. 29, 1945 2 Sheets-Sheet 2

INVENTOR
HENRY WALLMAN

BY M. O. Hayes

ATTORNEY

Patented May 26, 1953

2,640,157

UNITED STATES PATENT OFFICE 2,640,157

RAPID SEARCHING THERMAL AUTOMATIC FREQUENCY CONTROL

Henry Wallman, Cambridge, Mass., assignor, by mesne assignments, to the United States of America as represented by the Secretary of the Navy Application November 29, 1945, Serial No. 631,738

12 Claims. (Cl. 250—36)

This invention relates in general to the problem of automatic frequency control (AFC) and more particularly to those automatic frequency control circuits which function rapidly and accurately to maintain a predetermined mixer output frequency in ultra high frequency apparatus.

In radio echo detection systems, it is customary to use the transmitted signals as a basis for controlling the frequency of the local oscillator in order that the intermediate frequency generated as a result of the mixing action between a received target echo signal and the local oscillator is at all times substantially equal to the pre-tuned frequency of the intermediate frequency amplifier tuned circuits.

In the course of the development of high frequency equipment, various automatic frequency control circuits have been utilized with a certain degree of success. For example, one form of automatic frequency control circuit which is also applicable to low frequency receivers utilizes a discriminator circuit for comparing the reference signal and the frequency of the output of a velocity modulated local oscillator tube. The discriminator output is zero if the proper intermediate frequency is generated by the mixer. If the intermediate frequency drifts in one direction, a positive voltage output is obtained from the discriminator and frequency drift in the opposite direction results in negative voltage output. This discriminator output voltage is used as a control for the local oscillator to adjust the local oscillator frequency by variation of the electrode potential so that the desired beat frequency is always obtained. A disadvantage of ordinary frequency discriminator automatic frequency control circuits is that the polarity of the discriminator output voltage is correct and thus will maintain stable local oscillator operation for only one of the two possible intermediate frequency side bands determined by whether the local oscillator is operative above or below the transmitter frequency.

It has been observed that at high operating frequencies little difference exists between the intermediate frequency signals of the two side-bands and accordingly, excellent results may be obtained in a receiver utilizing a local oscillator operative either above or below the signal frequency by an amount equal to the intermediate frequency.

There is available a local oscillator tube having thermal means for automatic frequency control purposes. In one form of such thermally controlled oscillator, a strut is connected to the grids of the cavity resonator. This strut serves electrically as the plate of a triode tuning tube enclosed in the envelope containing the high frequency oscillator sections. Plate dissipation of this triode evidenced in the form of heat determines the physical length of the strut which in turn controls the mechanical deformation of the cavity and the frequency thereof. A tube of this type operating at super high frequencies is capable of tuning through 1000 megacycles per second on either side of the mean frequency with a tuning rate, as determined by triode strut dissipation, of the order of 2,000 megacycles per second per second.

The present invention contemplates an automatic frequency control system particularly adaptable to a tube of the foregoing description but generally adaptable to all systems wherein the frequency of an oscillator is controllable by variation in applied potentials.

It is therefore an object of my invention to provide a control circuit for substantially stabilizing an oscillator frequency at a fixed deviation from a reference frequency.

Another object of my invention is to provide an automatic frequency control circuit for an oscillator having an output signal in stable equilibrium when operative at a predetermined frequency deviation above or below a reference signal.

A further object of my invention is to provide a control circuit for rapidly and accurately adjusting a free running oscillator to a frequency of fixed deviation from a pulse signal of variable frequency.

A still further object of my invention is to provide a control circuit for jittering the frequency of a thermally controlled high frequency oscillator in a narrow band at a fixed deviation from a variable frequency source.

These and other objects of my invention will now become apparent from the following detailed specification taken in connection with the accompanying drawings in which.

Figure 1:
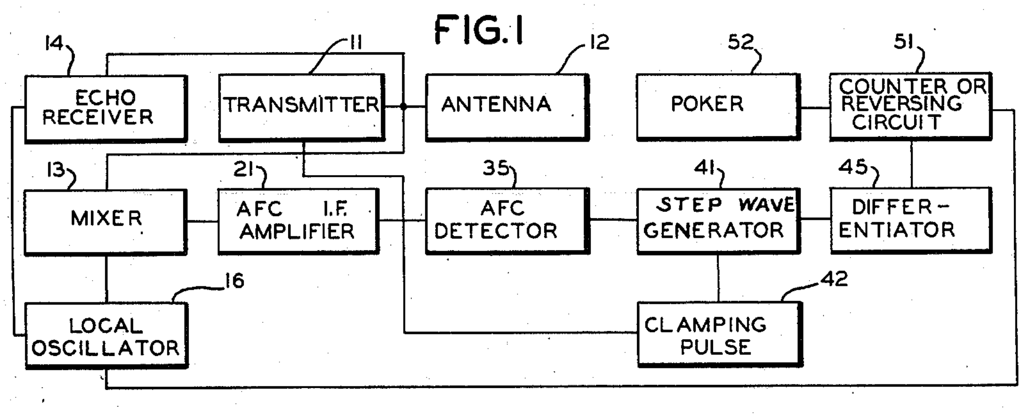
Fig. 1 is a simplified block diagram illustrating the relation between the various components required for the automatic frequency control system of the present invention.

Referring now to Fig. 1, there is illustrated the interconnection of circuits required for suitable operation of a radio echo detection transmitter and automatic frequency controlled receiver. The transmitter 11 comprises a high energy, ultra high frequency pulse modulated electron tube, as for example, a magnetron. The pulse energy of the transmitter 11 is connected by a suitable transmission line to a directional radiator or antenna 12. Energy reflected from a distant target is returned in the form of pulses to the antenna 12 and applied through switching means (not shown) to an echo receiver 14 and a frequency control circuit mixer 13. The detected video pulse output of the echo receiver is presented upon suitable indicating equipment as is well known in the art.

For the frequencies of operation concerned, the mixer 13 is preferably a sensitive crystal rectifier and is energized by pulses from the transmitter 11 through an attenuator (not shown) having sufficient loss to preclude damage to the crystal. The transmitter pulse frequency, which may fluctuate rapidly and widely, is thus used as the reference frequency in the frequency control circuit illustrated. The mixer 13 is also energized by the continuous signal output of a local oscillator 16 which is preferably a velocity modulated oscillator, thermally tuned by the mechanical deformation of a resonant cavity thereof. The extent of deformation is controlled by the heat dissipation in a strut joined to a wall of the cavity as previously discussed. An example of a tube of this type is the low voltage Neher tube which utilizes a self contained triode as the thermal control element for the cavity. Thus the plate of the control triode serves as the tuning strut, the length of which is a function of triode plate dissipation.

The function of the frequency control circuit herein illustrated is to maintain the frequency difference between the transmitter 11 and local oscillator 16 equal to the pretuned frequency of the automatic frequency control intermediate frequency amplifier 21 coupled to the output circuit of the mixer 13. It is emphasized at this point that the local oscillator 16 may be operative at either above or below the frequency of transmitter 11 with the sole restriction that the difference frequency always remains substantially equal to the intermediate frequency.

The general characteristics of the thermally tuned local oscillator tube 16 are such that the frequency of the tube is controllable over a comparatively wide range of frequency as determined by the triode control current. The application of heat to the oscillator control element results in a sweep of the oscillator output frequency through the control frequency spectrum centering about the desired signal frequency. The time required for the oscillator to sweep through the control band of frequencies may be of the order of one second and the change of frequency is essentially exponential in time. The frequency characteristics of the local oscillator are graphically illustrated in Fig. 3c which is a plot of local oscillator output frequency as a function of time. During the time period indicated as X the transmitter 11 is inoperative. At time 25, the oscillator frequency control heater is de-energized and the frequency then rises from the value indicated at point 26 to that indicated at point 27 while sweeping through the three critical frequencies, namely the transmitter frequency 31 and the pair of frequencies 32 and 33 equal to the transmitter frequency minus and plus the intermediate frequency respectively. When the triode heater control signal is turned on as at point 27, the oscillator frequency sweeps downward through the same frequencies to the minimum operating value.

The AFC intermediate frequency amplifier 21 is preferably constituted of a number of single tuned stages, and in order to overcome the effects of the inherent amplitude instability of the transmitter 11, a limiter circuit may be inserted prior to the final single tuned circuit. The output of the AFC intermediate frequency amplifier 21 is coupled to a detector 35 of conventional design and having a comparatively short output time constant, so that the detected signal appears as a series of video pulses. The amplitude of these video pulses will depend on the frequency of the signals from which they were derived and the frequency characteristic of the intermediate frequency amplifier stages following the limiter circuit.

Figure 2:
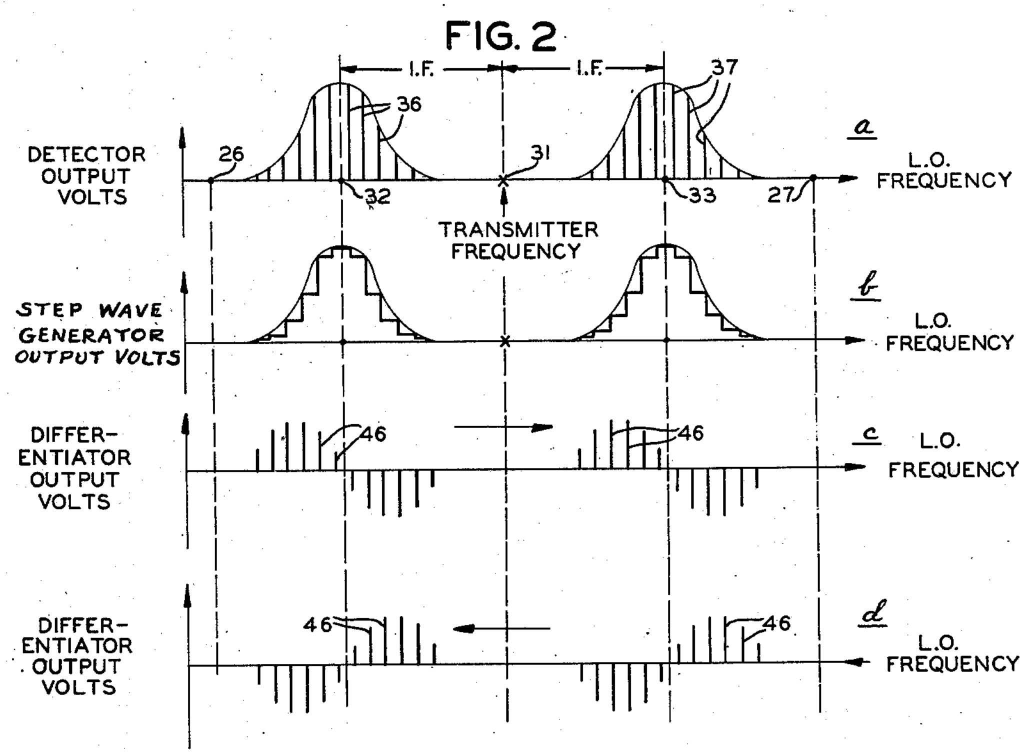
Fig. 2 is a graphical illustration of the signal wave forms within the system illustrated in Fig. 1 plotted as a function of local oscillator frequency.

For an understanding of the operation of the circuit as described to this point, reference is now made to Fig. 2 wherein the circuit characteristics are plotted as a function of local oscillator frequency variation in the range of frequencies included between points 26 and 27, or the minimum and maximum control frequencies as heretofore described in connection with Fig. 3c. In Fig. 2, as the local oscillator frequency increases from point 26 a plurality of video pulses 36 appear in increasing amplitude reaching a maximum at frequency 32 which represents a local oscillator frequency below the transmitter frequency 31 by an amount equal to the fixed resonant frequency of the intermediate frequency tuned circuits. As the frequency of the local oscillator rises above that indicated at point 32, the output amplitudes, of the video pulses from the detector 35 fall off to zero as illustrated.

As the local oscillator frequency output rises above the transmitter frequency 31, a detector output in the form of video pulses 37 again appears and rises to a maximum at frequency 33 which is above the transmitter frequency by an amount equal to the intermediate frequency. The envelopes of the output video pulses 36 and 37 follow the conventional resonance curve of a single tuned circuit and the number of pulses included thereunder is dependent upon the pulse repetition rate of the transmitter 11 and the rate of frequency change of the local oscillator 16.

Returning now to Fig. 1, the video pulse output of the detector 35 is coupled to a special wave form generator 41 which provides an output voltage at all times proportional to the amplitude of the preceding video pulse. The initiation of a transmitter pulse triggers a clamping pulse circuit 42 and causes a storage capacitor (not shown) in the special wave form generator 41 to charge to the peak voltage of the detector output pulse. In its simplest form, the step wave generator may consist of a triode having a diode and storage capacitor in series relationship in its anode circuit. Initially the capacitor is fully charged via a controllable charging path which is independent of the triode plate circuit. With the appearance of the first video pulse on the control grid of the triode, the tube is rendered conductive to complete a discharge path for the storage condenser and permit the latter element to discharge to the potential of the anode, which voltage level is proportionally related to the amplitude of the applied video pulse. This voltage level is maintained until the occurrence of the next video pulse because the increased anode potential established by the nonconductive status of the triode blocks the diode and prevents further discharge of the capacitor. During this same time interval the charging path is also rendered ineffective. Prior to the arrival of the next video pulse, the voltage across the storage condenser is transferred by means of a pair of electronically controlled switching tubes to an isolated output condenser; then the charging path of the first storage condenser is established long enough to restore the condenser to its fully charged value so that it can respond to the second pulse. For a detailed account of a circuit of this type reference is made to copending application Serial No. 631,948, filed November 30, 1945, of J. L. Lawson. As a result of the particular output wave form, the special circuits 41 and 42 have been designated a step wave generator. This wave form is illustrated in Fig. 2*b* which is a plot of the step wave circuit output voltage as a function of the local oscillator frequency variation. As the output of the detector 35 increases, as illustrated in Fig. 2*a*, the output of the step wave generator 41 correspondingly increases in steps, each step being clamped to the peak of the detector output signals until the following pulse changes the clamping level. As the local oscillator sweeps into tune the steps rise, and as it sweeps out of tune the steps decrease, thus providing an overall envelope which is essentially the same as that for the video pulses 36 and 37 illustrated in Fig. 2*a*. Similar wave forms are obtained for local oscillator frequencies centering about points 32 and 33.

As illustrated in Fig. 1, the wave form generated in the step wave circuit 41 is coupled to a video differentiator which, as is well understood, has an output instantaneously proportional to the rate of change in applied voltage level. For an input comprising the step wave output voltage, the differentiator 45 provides a plurality of sharply defined triggers such as 46 as illustrated in Figs. 2*c* and 2*d*. From basic differentiator consideration, these triggers are positive whenever the steps of voltage are increasing and are negative when the step wave output voltage is diminishing.

The detector output and step wave output voltage wave forms illustrated in Figs. 2*a* and 2*b* are always as illustrated independent of the direction of local oscillator frequency variation. However, the differentiator voltage output is sensitive to direction of frequency change as illustrated in Figs. 2*c* and 2*d*. In Fig. 2*c* the local oscillator frequency is assumed to be increasing throughout the controllable spectrum, and accordingly, the triggers 46 are first positive as the step wave output voltage rises and negative as it falls. This sequence is true for the envelopes of both side bands. In Fig. 2*d* the frequency is assumed to be decreasing, and as illustrated, the triggers are of opposite phase from those illustrated in Fig. 2*c*.

The positive or negative triggers originating in the differentiating circuit 45 are applied to a "scale-of-two" counter or reversing circuit 51 which has the characteristic of reversing its output polarity when properly triggered. This circuit also has the characteristic of being nonresponsive to positive triggers and responsive only to negative triggers. Each negative trigger causes a reversal of output which in this particular application is utilized to switch on or off the frequency control triode of the local oscillator. In operation the counter or reversing circuit 51 will flip over on each negative signal and reverse the direction of frequency sweep of the local oscillator 16. For purposes which will be described in greater detail later, a "poker" circuit 52 is provided and is essentially one which regularly triggers the counter circuit 51 with negative voltage pulses having a recurrence period somewhat longer than the time required for the local oscillator to sweep through substantially the entire controllable frequency range when the heat is applied or removed.

The method of operation of the automatic frequency control circuit of Fig. 1, will now be described in detail with reference to Fig. 3 which illustrates the output of the component circuits as a function of time. During the period X the transmitter 11 is inoperative. Fig. 3*a* illustrates the negative trigger output of the poker circuit 52. The period of these negative triggers 61 is substantially constant. Fig. 3*b* illustrates the effect of negative trigger pulses upon the reversing circuit 51. Thus the first applied trigger as for example poker pulse 61 turns off the heat applied to the local oscillator tuning strut, and the second negative trigger, which in this case also comes from the poker circuit 52, turns on the heater circuit. The local oscillator, during the period X, sweeps through a spectrum of frequencies as illustrated in Fig. 3*c*, as previously described. During the period X the output from the detector, step wave and differentiator circuits 35, 41 and 45 respectively are zero.

In the time interval Y, the transmitter 11 is operative, but for purposes of description the differentiator circuit 45 has not been connected to the counter or reversing circuit 51. The sweep of local oscillator frequency is thus accompanied by the generation of a double envelope 59, 60 of detector video output pulses illustrated in Fig. 3*d* and the corresponding double envelope 71, 72 of stepped output voltages of step wave generator 41, Fig. 3*e*. Since the frequency of the local oscillator for the period Y as illustrated in Fig. 3*c*, is decreasing, the differentiator pulse output is, in time, see Fig. 3*f*, first positive 73 then negative 74 and again positive 75 and negative 76 as the frequency passes through the second usable side band.

In time interval Z the transmitter 11 is operative and the differentiator 45 is connected to the counter circuit 51 at a time when the local oscillator frequency is rising. When the local oscillator frequency reaches 32, that is, a frequency below the transmitter frequency by an amount equal to the intermediate frequency, the output of the detector 35 is a maximum and will remain thus provided that neither the transmitter nor the local oscillator frequencies change. However, the frequency of the local oscillator is changing continuously due to the application or removal of heat. The frequency, therefore, will continue to rise until the step wave circuit output voltage begins to decrease. At this point the differentiator circuit will provide a negative triggering voltage to the counter or reversing circuit 51 and reverse the direction of heat flow. The frequency will thus begin to fall. As the frequency decreases, the output of the differentiator circuit 45 will consist of positive triggers having no effect upon the counter circuit until the local oscillator 16 passes through frequency 32 and the stepped voltage of step wave generator 41 again decreases. This will again provide a negative trigger to reverse the frequency sweep of the oscillator 16. If undisturbed, this condition of local oscillator jitter about the correct operating frequency 32, as shown in Fig. 3*c*, will continue and will remain in stable equilibrium, such that any deviation from frequency 32 will result in a required change in oscillator thermal control triode heat dissipation to restore the proper frequency.

During the period of operation of the frequency control circuit about a stable point, as for example, frequency 32, the poker circuit 52 will continue to inject regular negative triggering pulses into the counter circuit 51. When the local oscillator frequency is stably locked at one of the two proper operating frequencies 32 or 33, the negative poker trigger will have little effect and merely act as an infrequent false trigger. If on the other hand, the local oscillator frequency falls off for some indetermine reason to a value of the order of frequency 26, the following negative poker trigger will reverse the direction of oscillator thermal strut flow and restore the local oscillator 16 to a stable frequency of operation.

In a manner similar to that described for the locking of the local oscillator at frequency 32, the local oscillator will lock at frequency 33 if the frequency is decreasing from some point such as 27, Fig. 3c, at the time the control circuit is effectively energized. In this case the local oscillator frequency will continuously jitter about the mean frequency 33, and provide a substantially constant intermediate frequency output signal.

Figure 3:
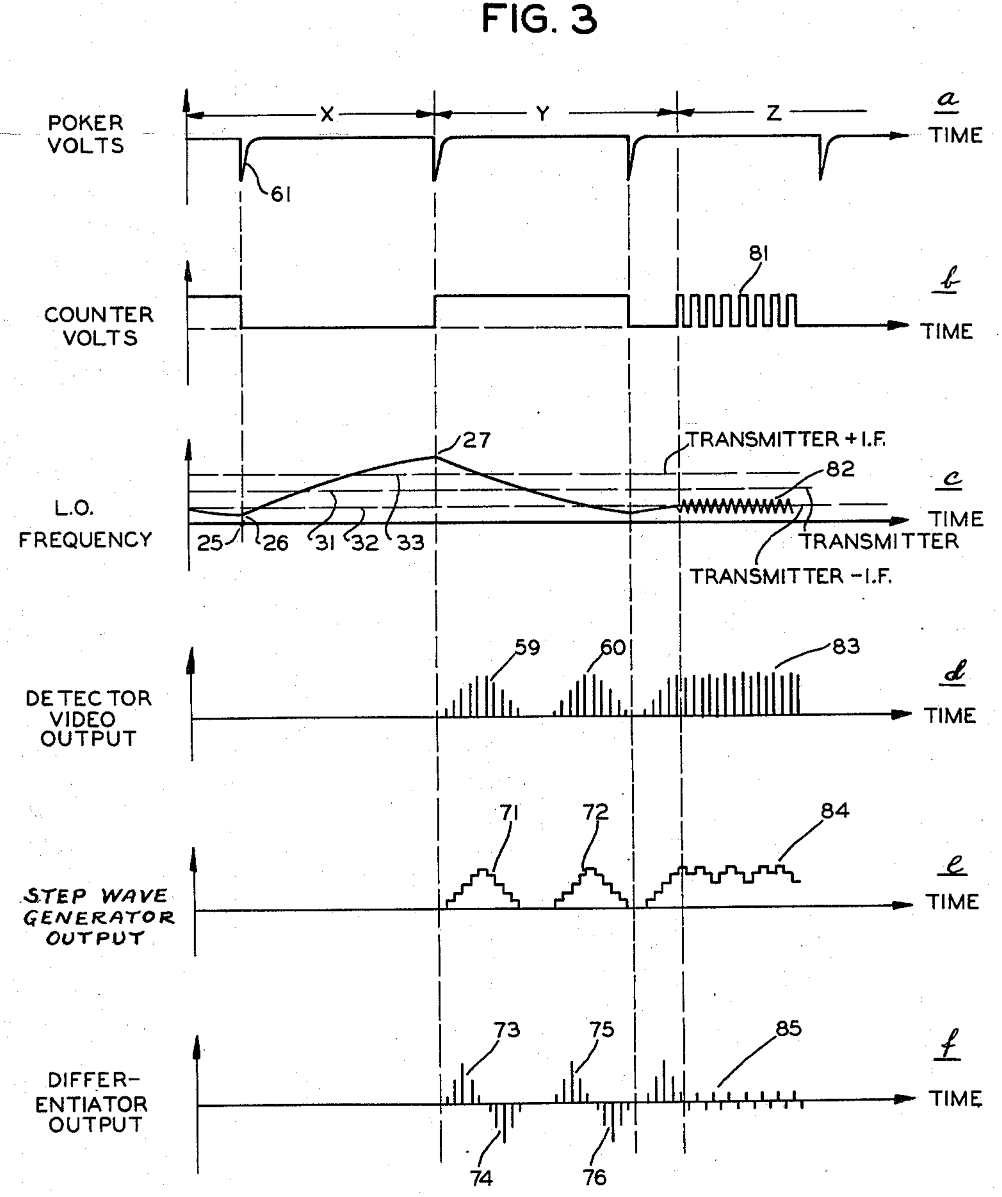
Fig. 3 is a graphical illustration of the output signals of the circuit components illustrated in Fig. 1 plotted as a function of time to facilitate better understanding of this automatic frequency control system.

The wave forms of circuit output during the time when the local oscillator frequency is locked on either frequency 32 or 33 are illustrated in Fig. 3. Thus the counter voltage, Fig. 3b, is a series of rectangular voltage blocks 81 reversing upon the receipt of a negative trigger pulse. The local oscillator frequency 82, Fig. 3c, is seen to jitter about the correct mean frequency. The detector video output 83, Fig. 3d, jitters somewhat in amplitude due to the small frequency sweep across the band of the tuned circuit in the intermediate frequency amplifier. The step wave voltage output 84, Fig. 3e, rises and falls in steps as the detector output correspondingly rises and falls. The differentiator output 85, Fig. 3f, illustrates the positive and negative pulses obtained during the time that the step wave output voltage varies as indicated.

The jitter of local oscillator frequency 82, Fig. 3c, is actually very small, since as previously mentioned both the tuning rate of the thermally controlled oscillator 16 and the range in which the frequency is controlled are large. Thus the local oscillator output frequency may jitter at a comparatively rapid rate even if the transmitter remains at a fixed frequency. The thermally controlled oscillator is capable of following the transmitter frequency through all normal frequency variations thereof.

As is illustrated in Fig. 1, the local oscillator signal output is coupled to the echo receiver 14, wherein it is mixed with the receiver input from the antenna for the generation of an intermediate frequency for amplification, detection and presentation upon indicating equipment. The exact frequencies of operation need not be specified since the control system is applicable over wide frequency ranges.

Since various modifications and extensions of the principles illustrated and described hereinabove may now become apparent to those skilled in the art, I prefer that this invention be defined not by the specific disclosures but by the spirit and scope of the appended claims.

What is claimed is:

1. In an automatic frequency control system apparatus for stabilizing the frequency of an oscillator at a predetermined frequency deviation from a pulsed reference signal, comprising a mixing circuit energized by said oscillator and said reference signals, a detector energized by said mixer circuit output signal providing pulses varying in amplitude in accordance with the frequency deviation of said oscillator signal from said reference signal, a step wave circuit energized by said last mentioned pulses providing an output instantaneously proportional to the amplitude of the preceding applied pulse, means for differentiating said step wave output signal to provide pulses of variable polarity, and means operative upon differentiator output pulses of a predetermined polarity to adjust the frequency of said oscillator.

2. In an automatic frequency control system, an oscillator of controllable signal frequency, a pulsed reference signal, means for stabilizing said oscillator signal at a predetermined frequency deviation above or below said reference signal frequency, comprising a tuned circuit resonant at a frequency substantially equal to said frequency deviation, a mixer energized by said oscillator and reference signal frequencies and providing said tuned circuit with a plurality of pulses of variable frequency, a detector coupled to said tuned circuit and providing a series of pulses of variable amplitude, means coupled to said detector and responsive to a control signal synchronized with said pulsed reference signal for providing a stepped wave form of amplitude instantaneously proportional to the amplitude of the preceding pulse from said detector, means for differentiating said stepped wave form to provide a plurality of positive and negative trigger pulses and a counter circuit operative upon trigger pulses of predetermined polarity for adjusting the frequency of said oscillator.

3. Apparatus as in claim 2 and including a trigger circuit providing periodic trigger pulses of said predetermined polarity to said counter circuit.

4. An electric circuit comprising, in combination, a high frequency oscillator, thermal tuning for said oscillator including means operative when suitably triggered to raise the frequency of said oscillator and means operative when suitably triggered to lower the frequency of said oscillator, an automatic frequency control system for sweeping the frequency of said oscillator about a mean frequency at a predetermined frequency deviation above or below the frequency of a pulsed reference high frequency signal, said automatic frequency control comprising a mixer energized by said oscillator and pulsed reference signals to provide a pulsed intermediate frequency signal, a single tuned intermediate frequency circuit providing an output of increasing amplitude pulses when said oscillator frequency is sweeping toward said mean frequency and decreasing amplitude pulses when said oscillator frequency is sweeping away from said mean frequency, a detector for the pulse output of said single tuned intermediate frequency circuit, a step wave circuit energized from said detector and providing a stepped wave form, means for differentiating said stepped waveform to provide a succession of positive and negative triggers and a counter circuit responsive to triggers of a predetermined polarity for reversing the sweep of said oscillator frequency.

5. Apparatus substantially as described in claim 3 and including a poker circuit operative to generate periodic trigger pulses of said predetermined polarity, said last mentioned trigger pulses being applied to said counter circuit.

6. In combination with a tunable oscillator having a tuning means with two alternate conditions of operation, said tuning means acting to increase the frequency of said oscillator at a predetermined rate when in a first condition of operation and to decrease the frequency of said oscillator at a predetermined rate when in the other condition of operation, a frequency control circuit for maintaining the frequency of said oscillator at a substantially constant deviation from the frequency of a first signal, said frequency control circuit comprising, a mixer responsive to a signal from said oscillator and said first signal and providing a second signal having a frequency equal to the difference in frequencies of the signals applied thereto, means responsive to said second signal producing a third series of signals having a characteristic indicative of the frequency of said second signal at preselected spaced time intervals, means responsive to said third signals for producing a fourth series of signals, said signals in said fourth series being indicative of the algebraic difference in said characteristic of successive signals in said third series, and means responsive to said fourth series of pulses for shifting the condition of operation of said tuning means in response to signals of a preselected polarity in said fourth series.

7. In combination with a tunable oscillator having a tuning means with a first and a second condition of operation, said tuning means acting to increase the frequency of said oscillator at a predetermined rate when in said first condition of operation and to decrease the frequency of said oscillator at a predetermined rate when in said second condition of operation, a control circuit for maintaining the frequency of said oscillator at a substantially constant deviation from the frequency of a first signal, said control circuit comprising a mixer responsive to a signal from said oscillator and said first signal and providing a second signal having a frequency equal to the difference in frequencies of the signals applied thereto, means responsive to said second signal producing a third series of signals, the amplitude of signals in said third series decreasing as the deviation between the frequency of said second signal and the desired frequency of deviation of said first signal and said oscillator signal increases, means responsive to said third series of signals producing a fourth series of signals, said signals in said fourth series being indicative of the algebraic difference in amplitude of successive signals in said third series, and means responsive to said fourth series of pulses for shifting the condition of operation of said tuning means in response to signals of a preselected polarity in said fourth series.

8. In combination with a tunable oscillator having a tuning means with a first and a second condition of operation, said tuning means acting to increase the frequency of said oscillator at a predetermined rate when in said first condition of operation and to decrease the frequency of said oscillator at a predetermined rate when in said second condition of operation, a control circuit for maintaining the frequency of said oscillators at a substantially constant deviation from the frequency of a first signal, said control circuit comprising a mixer responsive to a signal from said oscillator and said first signal and providing a second signal having a frequency equal to the difference in frequencies of the signals applied thereto, signal altering means responsive to said second signal and having a pass band characteristic in the form of single peak resonance curve having a maximum at the said desired frequency deviation, detector means coupled to the output of said signal altering means, said detector means producing a third series of time spaced signals indicative of the amplitude of signals applied thereto at corresponding spaced intervals of time, and means responsive to an algebraic difference of a predetermined sign between successive signals in said third series for shifting the condition of operation of said tuning means.

9. In combination with a tunable oscillator having a tuning means with a first and a second condition of operation, said tuning means acting to increase the frequency of said oscillator at a predetermined rate when in said first condition of operation and to decrease the frequency of said oscillator at a predetermined rate when in said second condition of operation, a control circuit for maintaining the frequency of said oscillators at a substantially constant deviation from the carrier frequency of a first pulse modulated signal, said control circuit comprising a mixer responsive to a signal from said oscillator and said first signal to provide a pulsed intermediate frequency signal, a circuit having a single peaked resonance curve pass band characteristic, the maximum peak of said curve being at a frequency equal to said desired deviation, a detector responsive to said circuit, and means responsive to an algebraic difference in amplitude of a preselected sign between successive signals in the output of said detector for shifting the condition of operation of said tuning means.

10. Apparatus as in claim 8 wherein said last-mentioned means comprises means providing a third series of signals having a repetition frequency equal to the repetition frequency of said first series and having an amplitude indicative of the algebraic difference in amplitude of successive signals in the output of said detector and means responsive to said third series of pulses for shifting the condition of operation of said tuning means upon the occurrence of a signal in said third series of a preselected polarity.

11. Apparatus as in claim 9, said apparatus further comprising a second circuit producing pulses of said preselected polarity at a repetition rate low compared to the repetition rate of said third series of signals and means coupling said last-mentioned pulses to said tuning means to shift the condition of operation thereof.

12. In combination with a tunable oscillator having a tuning means with a first and a second condition of operation, said tuning means acting to increase the frequency of said oscillator at a predetermined rate when in said first condition of operation and to decrease the frequency of said oscillator at a predetermined rate when in said second condition of operation, means for maintaining the frequency of said oscillators at a substantially constant deviation from the frequency of a first pulse modulated signal, said means comprising means including a tuned circuit providing a second signal variable in accordance with the deviation between the signal from said oscillator and said first signal, and means for differentiating said second signal to provide a control signal effective when of a predetermined polarity to shift the condition of operation of said tuning means.

HENRY WALLMAN.

References Cited in the file of this patent

UNITED STATES PATENTS

| Number | Name | Date |
|---|---|---|
| 2,135,946 | Mountjoy | Nov. 8, 1938 |
| 2,264,782 | Wheeler | Dec. 2, 1941 |